(12) United States Patent
Seong et al.

(10) Patent No.: US 9,991,485 B2
(45) Date of Patent: Jun. 5, 2018

(54) BATTERY MODULE HAVING VENTING GUIDING PORTION

(71) Applicant: LG CHEM, LTD., Seoul (KR)

(72) Inventors: Jun Yeob Seong, Daejeon (KR); Dal Mo Kang, Daejeon (KR); Youngsop Eom, Daejeon (KR)

(73) Assignee: LG CHEM, LTD., Seoul (KR)

( * ) Notice: Subject to any disclaimer, the term of this patent is extended or adjusted under 35 U.S.C. 154(b) by 258 days.

(21) Appl. No.: 14/567,949

(22) Filed: Dec. 11, 2014

(65) Prior Publication Data
US 2015/0093608 A1 Apr. 2, 2015

Related U.S. Application Data

(63) Continuation-in-part of application No. PCT/KR2013/007073, filed on Aug. 6, 2013.

(30) Foreign Application Priority Data

Aug. 17, 2012 (KR) .................. 10-2012-0090162

(51) Int. Cl.
*H01M 2/12* (2006.01)
*H01M 2/02* (2006.01)
(Continued)

(52) U.S. Cl.
CPC ....... *H01M 2/1241* (2013.01); *H01M 2/0267* (2013.01); *H01M 2/0287* (2013.01);
(Continued)

(58) Field of Classification Search
CPC .... H01M 2/1241; H01M 2/1235; H01M 2/12; H01M 10/0413; H01M 2/1077;
(Continued)

(56) References Cited

U.S. PATENT DOCUMENTS

2006/0286450 A1 12/2006 Yoon et al.
2008/0193838 A1 8/2008 Oh
(Continued)

FOREIGN PATENT DOCUMENTS

| JP | 2011-108652 A | 6/2011 |
|---|---|---|
| KR | 10-2006-0126106 A | 12/2006 |
| KR | 10-2009-0064041 A | 6/2009 |
| KR | 10-2010-0000764 A | 1/2010 |

OTHER PUBLICATIONS

International Search Report, dated Nov. 21, 2013, issued in PCT/KR2013/007073.

*Primary Examiner* — Cynthia K Walls
(74) *Attorney, Agent, or Firm* — Birch, Stewart, Kolasch & Birch, LLP

(57) ABSTRACT

A battery cell is provided. The battery cell includes a battery case, an electrode assembly located in the battery case, the electrode assembly comprising a cathode, an anode, and a separator disposed between the cathode and the anode, an electrolyte present in the battery case, the battery case being sealed at a perimeter thereof, and a frame coupled to the perimeter of the battery case, the frame having a venting guiding portion at the perimeter of the battery case, such that sealing of the battery case is released through the venting guiding portion when internal pressure of the battery cell increases, the venting guiding portion comprising a reduction in the amount of material of the frame in a predetermined location at the perimeter of the battery case. A battery cell module is also provided.

31 Claims, 8 Drawing Sheets

(51) Int. Cl.
  *H01M 2/10* (2006.01)
  *H01M 10/04* (2006.01)
  *H01M 10/052* (2010.01)

(52) U.S. Cl.
  CPC ........... *H01M 2/1077* (2013.01); *H01M 2/12* (2013.01); *H01M 2/1235* (2013.01); *H01M 10/0413* (2013.01); *H01M 2/0237* (2013.01); *H01M 10/052* (2013.01); *H01M 2220/20* (2013.01); *Y02E 60/122* (2013.01); *Y02P 70/54* (2015.11)

(58) Field of Classification Search
  CPC ............. H01M 2/0287; H01M 2/0267; H01M 2/0237; H01M 10/052; H01M 2220/20; Y02T 10/7011
  See application file for complete search history.

(56) References Cited

U.S. PATENT DOCUMENTS

| | | |
|---|---|---|
| 2010/0215998 A1 | 8/2010 | Byun et al. |
| 2011/0003185 A1 | 1/2011 | Kritzer |
| 2011/0104527 A1 | 5/2011 | Choi et al. |
| 2011/0117419 A1 | 5/2011 | Lee et al. |
| 2011/0189514 A1 | 8/2011 | Lee et al. |
| 2012/0129038 A1 | 5/2012 | Lim et al. |
| 2013/0216873 A1* | 8/2013 | Schaefer ............. H01M 2/0212 429/82 |

* cited by examiner

BATTERY MODULE HAVING VENTING GUIDING PORTION

CROSS-REFERENCE TO RELATED APPLICATIONS

This application is a continuation-in-part application of International Application No. PCT/KR2013/007073, filed on Aug. 6, 2013, which claims priority to Korean Patent Application No. 10-2012-0090162, filed Aug. 17, 2012, all of which are expressly incorporated herein by reference in their entireties.

BACKGROUND OF THE INVENTION

1. Field of the Invention

The present invention relates to a battery cell having a battery case and a frame and, more particularly a battery cell having battery case and a frame, where the frame includes a venting guiding portion.

2. Description of Related Art

A battery module including a plurality of battery cells as unit batteries is preferably manufactured so as to have as small a size and weight as possible. For this reason, a prismatic battery or a pouch-shaped battery, which can be stacked with high integration and has a small weight to capacity ratio, is usually used as a battery cell of the battery module. In particular, much interest is currently focused on the pouch-shaped battery, which uses an aluminum laminate sheet as a sheathing member, because the pouch-shaped battery is lightweight, the manufacturing cost of the pouch-shaped battery is low, and it is possible to easily modify the shape of the pouch-shaped battery.

Gas may be generated in the battery cell as the unit battery when the battery cell operates in an abnormal state due to overcharge, overdischarge, overheating, external impact, etc. For example, gas is generated in an overheated battery and the gas pressurized by a pouch-shaped battery case accelerates decomposition of battery elements. As a result, the battery is continuously overheated and gas is further generated in the overheated battery. When overheating of the battery and generation of gas in the overheated battery reach certain critical points, the battery may catch fire or explode. Furthermore, in a case in which a plurality of unit batteries clusters are provided in a limited space, such as in a battery module, a large scale accident may occur.

Consequently, it is necessary to provide a structure that is capable of preventing combustion or explosion of a battery cell when gas is generated in the battery cell.

In addition, in a case in which a battery module is manufactured using a plurality of battery cells, a plurality of members for mechanical fastening and electrical connection between the battery cells is generally needed and, as a result, a process of assembling the mechanical fastening and electrical connection members is very complicated. Furthermore, there is needed a space for coupling, welding, or soldering the mechanical fastening and electrical connection members with the result that the total size of a system is increased. The increase in size of the system is not preferable in the aspect of spatial limitations of an apparatus or device in which a middle or large-sized battery module is installed. Moreover, the middle or large-sized battery module must be configured to have a more compact structure such that the middle or large-sized battery module can be effectively installed in a limited inner space, such as a vehicle.

In particular, a plurality of parts is needed to stack a plurality of battery cells in a fixed state. For example, it is necessary to stably fix the battery cells in place using battery cell fixing parts. As a result, an assembly process is complicated and difficulty in the manufacturing process is increased. In addition, volume and weight of the battery module are increased and the manufacturing cost of the battery module is raised.

Therefore, there is a necessity for a battery module which can be manufactured to have a simple and compact structure, in which the number of parts constituting the battery module is reduced to improve efficiency of an assembly process while decreasing the manufacturing cost of the battery module, and which is configured to have a structure for preventing combustion or explosion of a battery cell when gas is generated in the battery cell.

BRIEF SUMMARY OF THE INVENTION

The present invention has been made to solve one or more of the above problems and one or more of other technical problems that have yet to be resolved.

One object of the present invention to provide a battery module configured to have a structure for preventing combustion or explosion of a battery cell when gas is generated in the battery cell.

Another object of the present invention to provide a battery module which can be manufactured to have a simple and compact structure and in which the number of parts constituting the battery module may be reduced to improve efficiency of an assembly process while decreasing the manufacturing cost of the battery module.

In accordance with one aspect of the present invention, the above and other objects can be accomplished by the provision of a battery module including a battery cell array including two or more stacked battery cells, each of which is configured to have a structure in which an electrode assembly, including a cathode, and anode, and a separator disposed between the cathode and the anode, is received in a battery case together with an electrolyte in a sealed state, frames for fixing the respective battery cells to form a battery cell stack structure, each of the frames being integrally coupled to an outer circumference of a corresponding one of the battery cells, wherein at least one of the frames is provided with a venting guiding portion, from which a portion of the outer circumference of each of the battery cells is exposed, such that sealing of the battery case is released through the venting guiding portion when internal pressure of each of the battery cells increases.

A conventional battery cell is configured to have a structure in which a predetermined portion of a battery case is weakened such that the weakened portion of the battery case is ruptured when internal pressure of the battery cell increases to discharge gas from the battery cell through the ruptured portion of the battery case or a structure in which venting is guided through an additional gas discharge structure. In the structure in which the weakened portion is formed at the battery case as described above, however, it is difficult to prevent penetration of external moisture and durability of the battery cell is reduced. In a case in which the additional gas discharge structure is included, on the other hand, a manufacturing process is complicated with the result that the manufacturing cost of the battery cell is increased. For a pouch-shaped battery case, it is difficult to form such an additional gas discharge structure due to properties of a case material.

In the battery module according to one aspect of the present invention, however, each of the frames is coupled to the outer circumference of a corresponding one of the battery cells and each of the frames is provided with a venting guiding portion, from which a portion of the outer circumference of a corresponding one of the battery cells is exposed, such that gas is discharged through the venting guiding portion in a predetermined direction when internal pressure of each of the battery cells increases. Consequently, it is possible to easily and simply form a venting structure by coupling each of the frames having the venting guiding portion to a corresponding one of the battery cells without a necessity for forming a weak portion at each of the battery cells.

Coupling between the outer circumference of each of the battery cells and a corresponding one of the frames may be achieved using various methods, such as assembly, bonding, and molding. Preferably, the outer circumference of each of the battery cells and a corresponding one of the frames are integrally coupled to each other by insert injection molding.

In a case in which the outer circumference of each of the battery cells and a corresponding one of the frames are integrally coupled to each other by insert injection molding, the frames may be stably coupled to the respective battery cells without carrying out a process of fixing the frames to the respective battery cells in place during a process of assembling the battery module.

In a concrete example, each of the battery cells may be a plate-shaped battery cell that is capable of providing a high stacking rate in a limited space. Plate-shaped battery cells may be stacked such that one side or opposite sides of one battery cell face a corresponding side or corresponding sides of another adjacent battery cell(s) to form the battery cell array.

For example, each of the battery cells may be a pouch-shaped battery cell configured to have a structure in which an electrode assembly is mounted in a battery case made of a laminate sheet including a resin layer and a metal layer.

Specifically, each of the battery cells may be a pouch-shaped battery cell configured to have a structure in which an electrode assembly of a cathode/separator/anode structure is received in a battery case together with an electrolyte in a sealed state. For example, each of the battery cells may be a plate-shaped battery cell configured to have an approximately rectangular hexahedral structure having a small thickness to width ratio. In general, the pouch-shaped battery cell includes a pouch-shaped battery case. The battery case is configured to have a laminate sheet structure in which an outer coating layer formed of a polymer resin exhibiting high durability, a barrier layer formed of a metal material blocking moisture or air, and an inner sealant layer formed of a thermally bondable polymer resin are sequentially stacked.

The battery case of the pouch-shaped battery cell may be configured to have various structures. For example, the battery case of the pouch-shaped battery cell may be configured to have a structure in which an electrode assembly is received in a receiving part formed at an upper inner surface and/or a lower inner surface of a two-unit member and upper and lower contact regions of the edge of the battery case are sealed by thermal bonding. The pouch-shaped battery cell with the above-stated construction is disclosed in PCT International Application No. PCT/KR2004/003312, which has been filed in the name of the applicant of the present patent application. The disclosure of the above-mentioned patent application is hereby incorporated by reference as if fully set forth herein. Alternatively, as shown in FIG. 2, the battery case may be configured to have a structure in which an electrode assembly is received in a receiving part formed at an upper inner surface and/or a lower inner surface of a one-unit member and the upper and lower contact regions of the edge of the battery case are sealed by thermal bonding.

The pouch-shaped battery cells may be stacked in a state in which the pouch-shaped battery cells are fixed by the respective frames. Specifically, a corresponding one of the frames may be integrally coupled to each pouch-shaped battery cell such that the frame covers the outer circumference of the battery cell sealed by thermal bonding.

Each of the battery cells may be configured to have a structure in which a cathode terminal and an anode terminal protrude from one side of the outer circumference thereof or a structure in which a cathode terminal protrudes from one side of the outer circumference thereof and an anode terminal protrudes from the opposite side of the outer circumference thereof. In this case, each of the frames may be integrally coupled to the entirety of the outer circumference of a corresponding one of the battery cells excluding the cathode terminal, the anode terminal, and the venting guiding portion.

The venting guiding portion may be formed in any directions, preferably excluding a direction in which the cathode terminal and the anode terminal protrude. In a concrete example, the venting guiding portion may be formed at a portion of the outer circumference of each of the battery cells in a direction perpendicular to the direction in which the cathode terminal and the anode terminal of each of the battery cells protrude when viewed from above.

The venting guiding portion may be formed at each of the frames. The venting guiding portions may be formed at the same positions of the frames such that the venting guiding portions are arranged in a specific direction in a case in which the battery cells, to which the frames are respectively coupled, are stacked.

In one aspect, the venting guiding portion is not particularly restricted so long as a portion of the outer circumference of each of the battery cells is exposed or can be exposed from the venting guiding portion. For example, the venting guiding portion may be formed by cutting a portion of each of the frames such that a portion of the outer circumference of a corresponding one of the battery cells is exposed. Alternatively, the venting guiding portion may be provided by reducing the height of the frame in a thickness direction of the frame or the venting guiding portion may be provided by reducing the width of the frame relative to adjacent portions of the frame. Alternatively, other configurations may be utilized provided the result includes a designed weakness to facilitate one or more the objects of the invention. For instance, alternative embodiments include providing the venting guiding portion(s) by reducing the amount of material of the frame at one or more predetermined location of the frame.

In a concrete example, each of the frames may be provided with an assembly type fastening structure, by which the frames are coupled to each other, such that the battery cell array forms a stable stack structure. Consequently, it is possible to easily and simply achieve coupling between the frames without a necessity of providing additional frame fastening means.

In a concrete example, the assembly type fastening structure may include a combination of a fastening protrusion formed at one side of each of the frames and a fastening groove formed at the other side of each of the frames so as to correspond to the fastening protrusion. For example, the fastening protrusion may be formed at the top or the bottom of each of the frames and the fastening groove may be formed at the bottom or the top of each of the frames on a position corresponding to the fastening protrusion. When the frames are stacked and assembled, therefore, the assembly type fastening structure is formed by coupling between the fastening protrusions and the fastening grooves of the upper frame and the lower frame.

As a concrete example of the assembly type fastening structure, the fastening protrusion may be formed in the shape of a cylinder protruding from a surface of each of the frames and may include a hook tapered along an outer circumference of an upper end of the cylinder and, on the other hand, the fastening groove may be formed at a side opposite to the fastening protrusion in a cylindrically depressed shape and may be provided at an inner circumference thereof with a catching protrusion, to which the hook of the fastening protrusion is fastened.

In this case, the hook may be provided at the upper part thereof with one or more hollow portions, by which the hook is elastically fastened into the fastening groove. In addition, the fastening protrusion and the fastening groove may be formed at corner portions of each of the frames.

In another concrete example, the fastening protrusion may be formed in a wedge shape protruding while abutting on one side of each of the frames and may include a hook tapered outwardly of each of the frames. In addition, the fastening groove may be formed at a side opposite to the fastening protrusion in a depressed shape corresponding to the wedge shape and may be provided with an opening, into which the hook of the fastening protrusion is fastened.

The position and number of the fastening protrusions and the fastening grooves is not particularly restricted so long as the frames can be stably coupled to each other by the fastening protrusions and the fastening grooves. For example, one or more fastening protrusions and one or more fastening grooves may be formed at an edge of each of the frames.

Preferably, however, the fastening protrusion and the fastening groove of the assembly type fastening structure are integrally formed at each of the frames. That is, the fastening protrusion and the fastening groove are included as integrated portions of each of the frames, it is possible to assemble and fasten the battery cells without using additional separate members.

The material for each of the frames is not particularly restricted. For example, each of the frames may be made of rubber or plastic. More specifically, each of the frames may be made of thermo plastic polyurethane (TPU), silicone, etc. The frames, each of which is made of such an elastic material, may correctly fix the battery cell array without applying excessive pressure to the battery cell array and absorb impact when external force and vibration are applied to the battery cell array, thereby improving stability of the battery cells.

The battery cells are not particularly restricted so long as the battery cells provide high voltage and high current when a battery module or a battery pack is constituted by the battery cells. For example, each of the battery cells may be a lithium secondary battery having a large energy storage quantity per volume.

In accordance with another aspect of the present invention, there is provided a battery pack including the battery module with the above-stated construction as a unit module.

The battery pack may be manufactured by combining the secondary batteries as unit modules based on desired power and capacity. In addition, the battery pack according to the present invention may be used as a power source for an electric vehicle, a hybrid electric vehicle, a plug-in hybrid electric vehicle, or a power storage device in consideration of installation efficiency and structural stability. However, an applicable range of the battery pack according to the present invention is not limited thereto.

In accordance with a further aspect of the present invention, there is provided a device including the battery pack with the above-stated construction as a power source. Specifically, the device may be an electric vehicle, a hybrid electric vehicle, a plug-in hybrid electric vehicle, or a power storage device.

The structure and manufacturing method of the device are well known in the art to which the present invention pertains and, therefore, a detailed description thereof will be omitted.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 1:
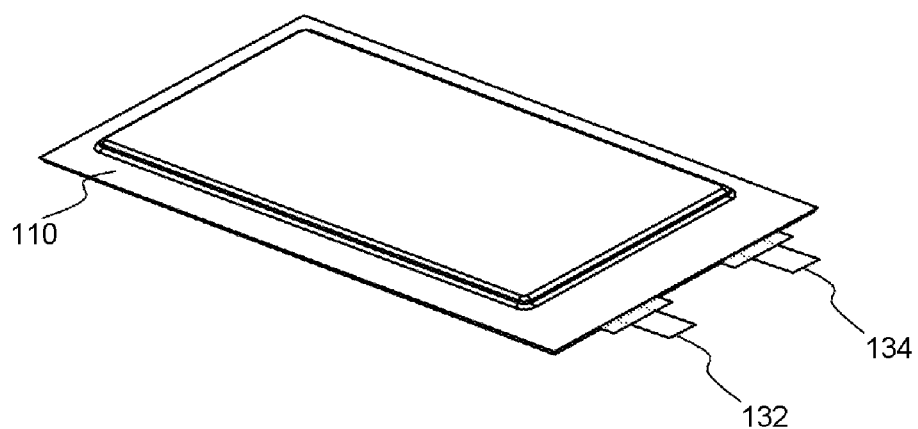
FIG. 1 is a perspective view showing an exemplary battery cell which will be mounted in a battery module.
Figure 2:
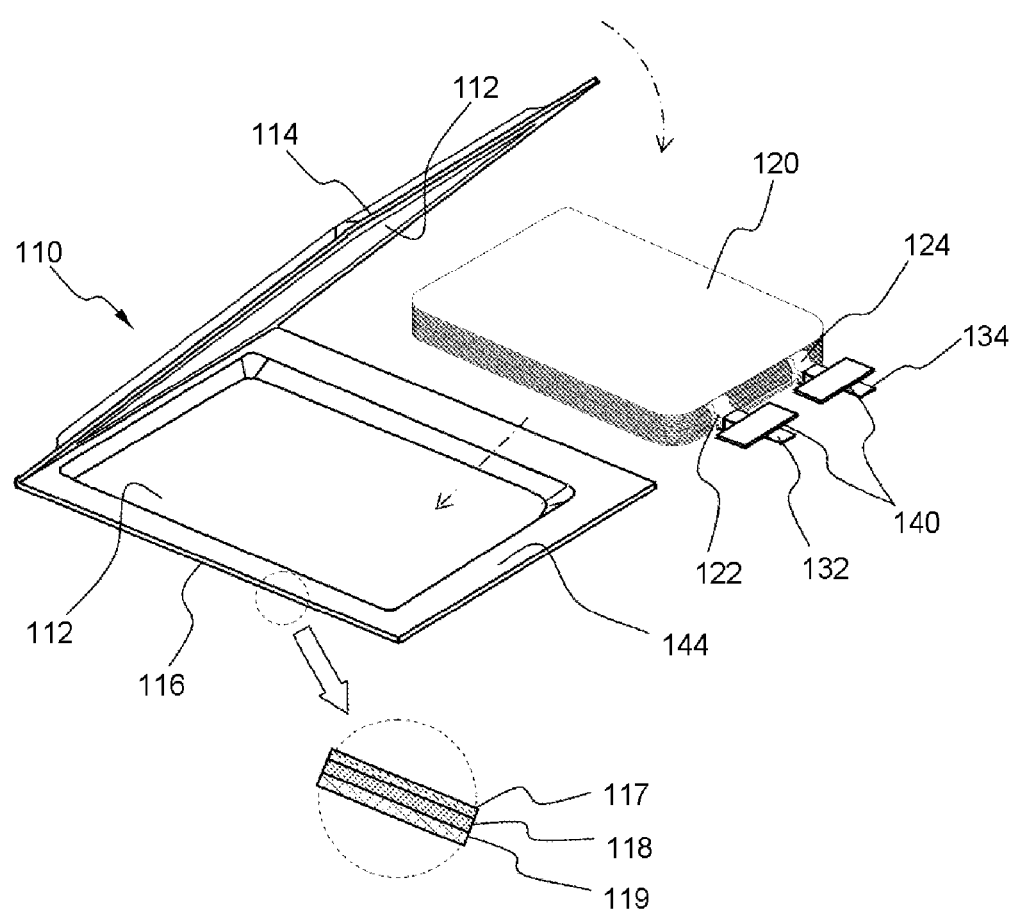
FIG. 2 is an exploded perspective view showing the battery cell of FIG. 1.

FIG. 1 is a perspective view typically showing an exemplary battery cell which will be mounted in a battery module according to the present invention and FIG. 2 is an exploded perspective view typically showing the battery cell of FIG. 1.

Referring to these drawings, a pouch-shaped battery cell 100 is configured to have a structure in which an electrode assembly 120, including cathodes, anodes, and separators disposed respectively between the cathodes and the anodes, is mounted in a pouch-shaped battery case 110 in a sealed state such that two electrode terminals 132 and 134 electrically connected to cathode and anode tabs 122 and 124 of the electrode assembly 120 are exposed to the outside.

The battery case 110 includes an upper case 114 and a lower case 116, each of which has a depressed receiving part 112, in which the electrode assembly 120 is located.

The cathode tabs 122 and the anode tabs 124 of the electrode assembly 120, which is configured to have a folded type structure, a stacked type structure, or a stacked/folded type structure, are respectively coupled to the electrode terminals 132 and 134 by fusing. In addition, insulating films 140 are attached to the top and bottom of each of the electrode terminals 132 and 134 to prevent the occurrence of a short circuit between a thermal bonding device and the electrode terminals 132 and 134 and to secure sealing between the electrode terminals 132 and 134 and the battery case 110 when the outer circumferences of the upper case 114 and the lower case 116 are thermally welded to each other using the thermal bonding device.

The upper case 114 and the lower case 116 each include an outer resin layer 117, an isolation metal layer 118, and an inner resin layer 119. The inner resin layer 119 of the upper case 114 and the inner resin layer 119 of the lower case 116 are fixed to each other in tight contact by heat and pressure generated from a thermal bonding device (not shown).

A sealed portion is formed by thermally bonding the outer circumferences of the upper case 114 and the lower case 116 in a state in which the electrode assembly 120, which is impregnated with an electrolyte, is located in the receiving part 112.

Figure 3:
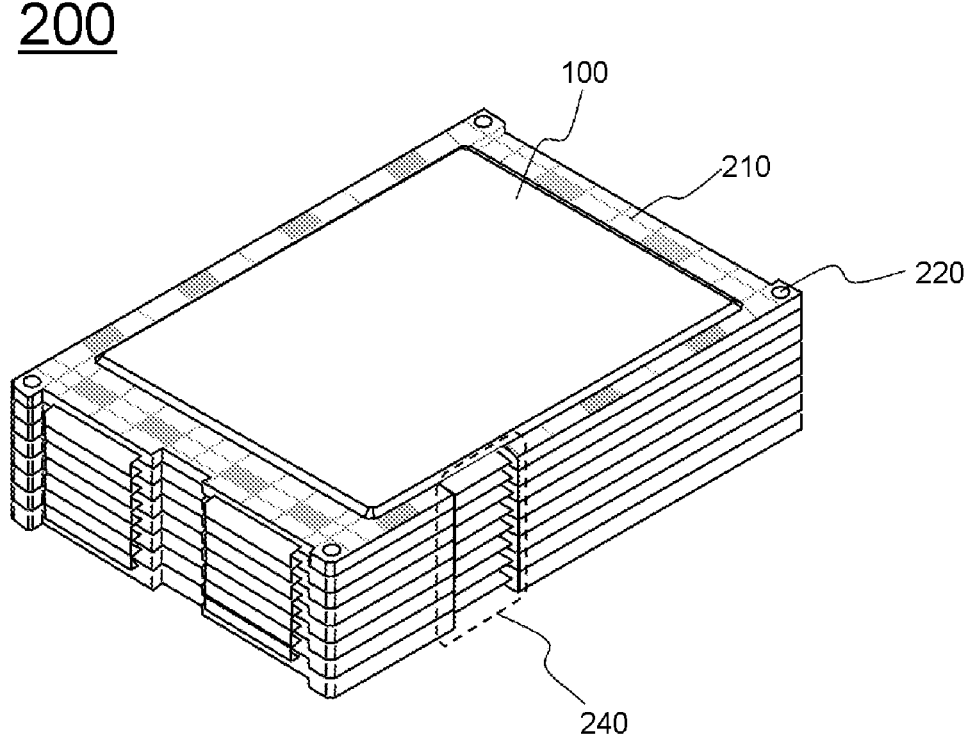
FIG. 3 is a perspective view showing a battery module according to an embodiment of the present invention.
Figure 4:
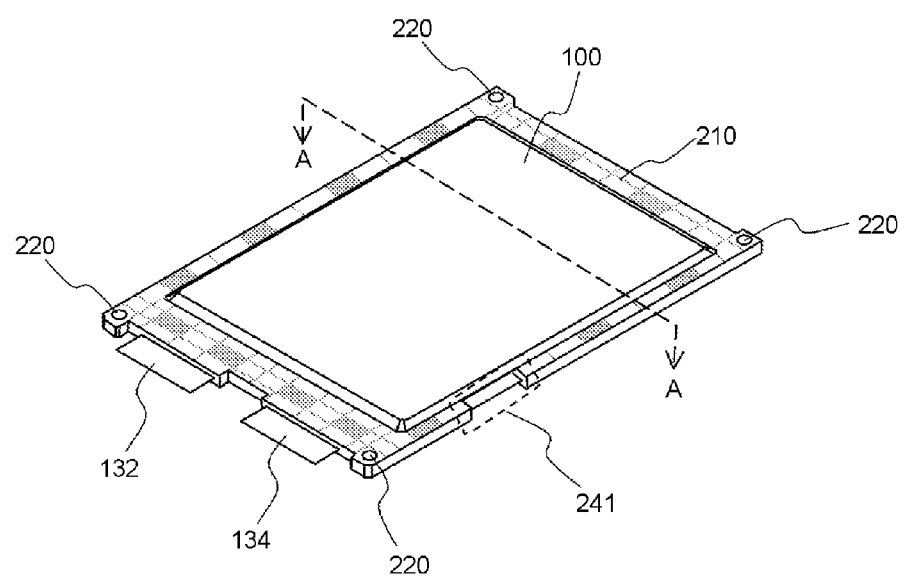
FIG. 4 is a perspective view showing a structure in which a frame is coupled to a battery cell.

FIG. 3 is a perspective view showing a battery module according to an embodiment of the present invention and FIG. 4 is a perspective view showing a structure in which a frame is coupled to a battery cell.

For the convenience of description, a housing, a cable, a protection circuit, etc., which are generally included in a battery module, are omitted from FIG. 3. Referring to FIGS. 3 and 4, a battery module 200 is configured to have a structure in which a plurality of battery cells 100 is stacked to form a battery cell array and a frame 210 is coupled to each of the battery cells 100. The battery cells 100 are plate-shaped battery cells 100 providing a high stacking rate in a limited space. The plate-shaped battery cells 100 are stacked such that one side or opposite sides of a battery cell 100 face a corresponding side or corresponding sides of another adjacent battery cell(s) 100 to form a battery cell array.

The outer circumference of each of the battery cells 100 is integrally coupled to a frame 210 by insert injection molding. The frame 210 is provided with a venting guiding portion 240, from which a portion of the outer circumference of each of the battery cells 100 is exposed, such that sealing of the battery case is released through the venting guiding portion 240 when internal pressure of each of the battery cells 100 increases. The frame 210 is also provided with an assembly type fastening structure 220, by which the frames 210 are coupled to one another. The frames 210 are coupled and fixed to one another by the assembly type fastening structure 220 in a state in which the frames 210 are stacked in the vertical direction.

The venting guiding portion 240 is formed at each of the frames 210. Specifically, the venting guiding portion 240 is formed at a portion of the outer circumference of each of the battery cells 100 in a direction perpendicular to a direction in which a cathode terminal 132 and an anode terminal 134 of each of the battery cells 100 protrude when viewed from above. In addition, venting guiding portions 240 are formed at the same positions of the frames 210 such that the venting guiding portions 240 are arranged in a specific direction in a case in which the battery cells 100, to which the frames 210 are respectively coupled, are stacked.

Each venting guiding portion 240 is formed by cutting a portion of a corresponding one of the frames 210 such that a portion of the outer circumference of a corresponding one of the battery cells 100 is exposed.

The assembly type fastening structure 220 includes a combination of a fastening protrusion formed at one side of each of the frames 210 and a fastening groove formed at the other side of each of the frames 210 so as to correspond to the fastening protrusion. That is, the fastening protrusion is formed at the top of each of the frames 210 and the fastening groove is formed at the bottom of each of the frames 210 on a position corresponding to the fastening protrusion. When the frames 210 are stacked and assembled, therefore, the assembly type fastening structure 220 is formed by coupling between the fastening protrusions and the fastening grooves of the upper frame 210 and the lower frame 210. A concrete example of the assembly type fastening structure will hereinafter be described in detail with reference to FIGS. 7 and 9.

Figure 5:
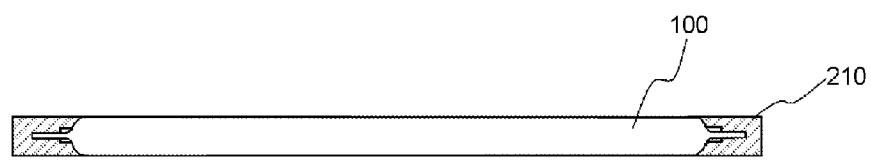
FIG. 5 is a vertical sectional view taken along line A-A of FIG. 4.

FIG. 5 is a vertical sectional view taken along line A-A of FIG. 4.

Referring to FIG. 5 together with FIG. 4, a pouch-shaped battery cell 100 is configured such that a plurality of pouch-shaped battery cells 100 is stacked in a state in which the pouch-shaped battery cells 100 are fixed by corresponding frames 210. The frame 210 is integrally coupled to the pouch-shaped battery cell 100 such that the frame 210 covers an outer circumference of the pouch-shaped battery cell 100 sealed by thermal bonding except for a predetermined location of the venting guiding portion. That is, the entirety of the frame 210 is integrally coupled to the outer circumference of the battery cell 100 excluding the cathode terminal 132 and the anode terminal 134 of the battery cell 100. This coupling structure is formed by insert injection molding.

Figure 6:
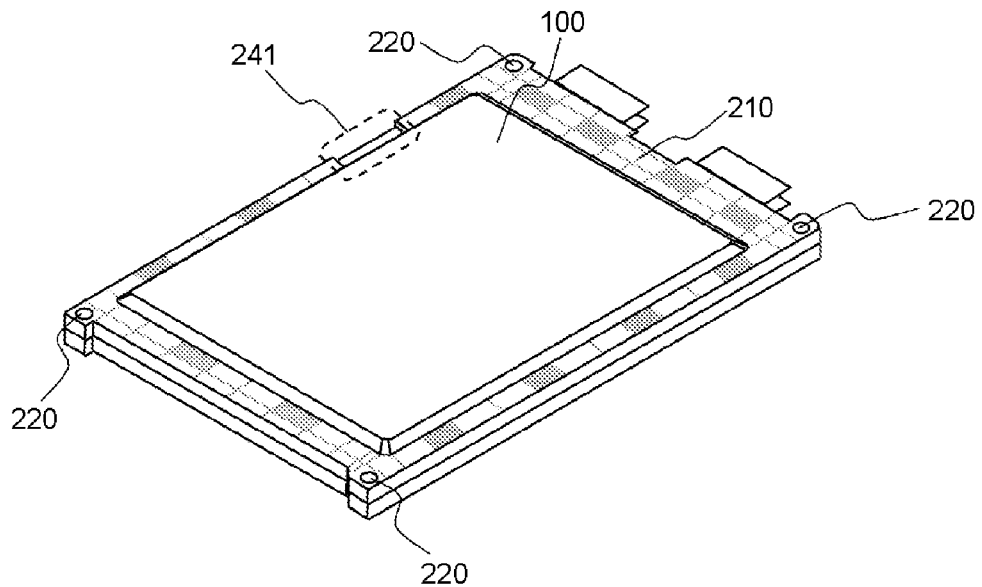
FIG. 6 is a perspective view showing a structure in which two battery cells, each of which is coupled with the frame of FIG. 4, are stacked.
Figure 7:
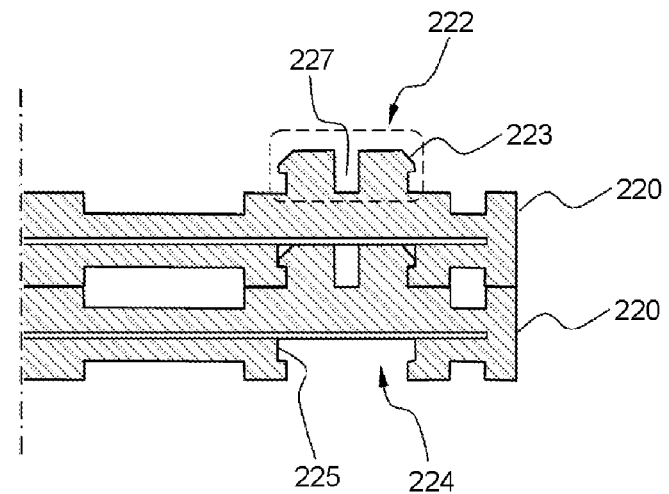
FIG. 7 is a vertical sectional view showing an assembly type fastening structure of FIG. 6.

FIG. 6 is a perspective view showing a structure in which two battery cells 100, each of which is coupled with the frame 210 of FIG. 4, are stacked and FIG. 7 is a vertical sectional view typically showing an assembly type fastening structure of FIG. 6.

A fastening protrusion 222 of the assembly type fastening structure is formed in the shape of a cylinder protruding from the surface of the frame 210. The fastening protrusion 222 includes a hook 223 tapered along the outer circumference of the upper end of the cylinder. A fastening groove 224 of the assembly type fastening structure is formed at a side opposite to the fastening protrusion 222 in a cylindrically depressed shape. The fastening groove 224 is provided at the inner circumference thereof with a catching protrusion 225, to which the hook 223 of the fastening protrusion 222 is fastened.

The hook 223 is provided at the upper part thereof with a hollow portion 227, by which the hook 223 is elastically fastened into the fastening groove 224. The fastening protrusion 222 and the fastening groove 224 are formed at each corner portion of the frame 210.

Figure 8:
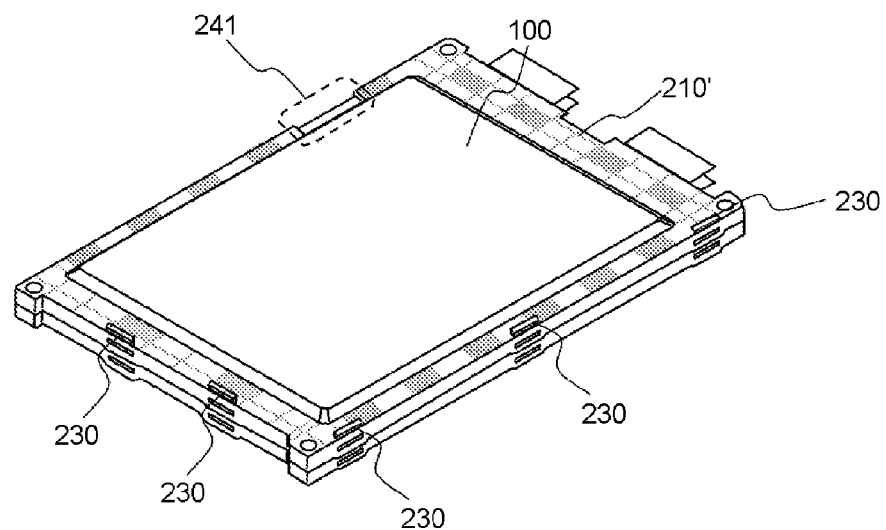
FIG. 8 is a perspective view showing a structure in which two battery cells, each of which is coupled with the frame of FIG. 4, are stacked.
Figure 9:
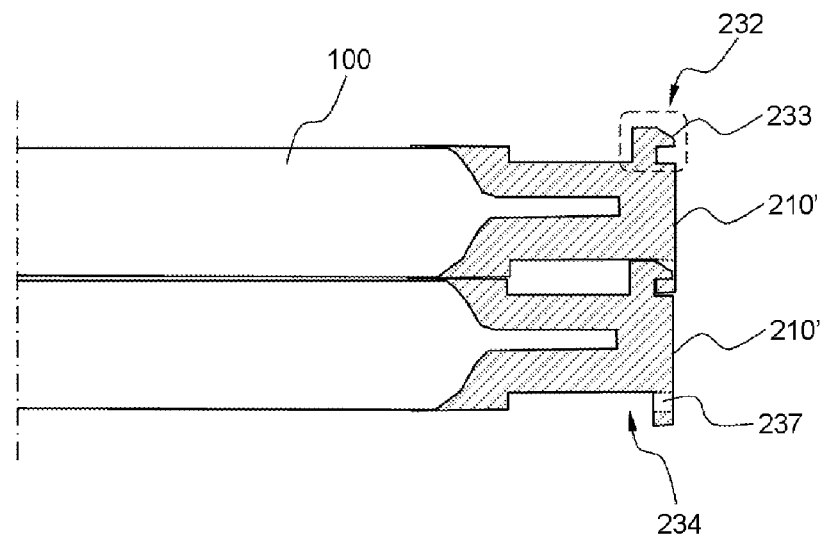
FIG. 9 is a vertical sectional view showing an assembly type fastening structure of FIG. 8.

FIG. 8 is a perspective view showing a structure in which two battery cells, each of which is coupled with the frame of FIG. 4, are stacked and FIG. 9 is a vertical sectional view typically showing an assembly type fastening structure of FIG. 8.

A fastening protrusion 232 of the assembly type fastening structure is formed in a wedge shape protruding while abutting on one side of a frame 210'. The fastening protrusion 232 includes a hook 233 tapered outwardly of the frame 210'. A fastening groove 234 of the assembly type fastening structure is formed at a side opposite to the fastening protrusion 232 in a depressed shape corresponding to the wedge shape. The fastening groove 234 is provided with an opening 237, into which the hook 233 of the fastening protrusion 232 is fastened. Pluralities of fastening protrusions 232 and fastening grooves 234 are formed at the edge of the frame 210' such that a plurality of frames 210' is coupled to each other by coupling between the fastening protrusions 232 and the fastening grooves 234.

While the foregoing embodiments have been directed to a frame having a venting guiding portion formed by cutting out or otherwise removing a section of the frame, it is possible to provide one or more venting guiding portion(s) by reducing the amount of material of the frame at a predetermined location of the frame. Two different illustrative embodiments of the venting guiding portion(s) are shown in FIGS. 10, 11 and 12.

Figure 10:
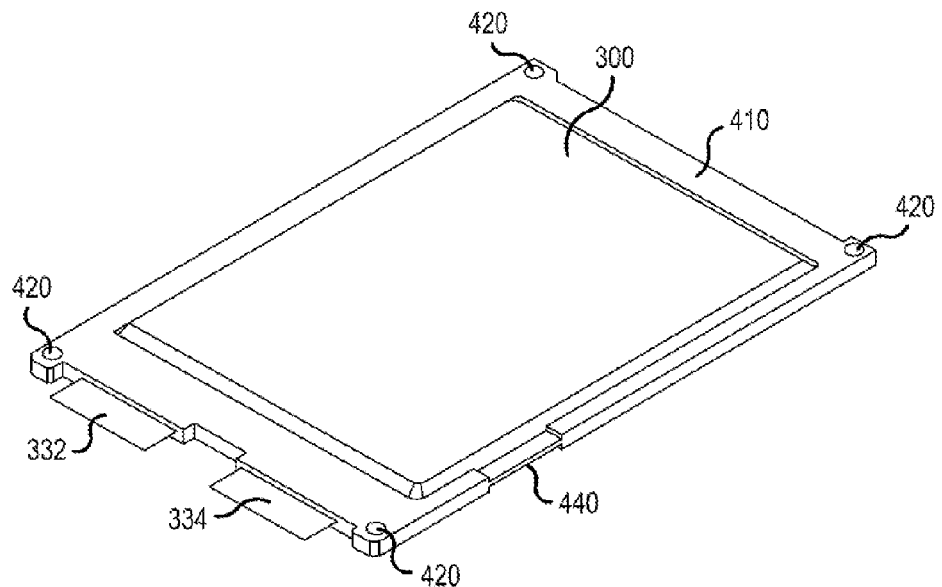
FIG. 10 is a perspective view showing a structure in which a frame is coupled to a battery cell according to another embodiment of the present invention.
Figure 11:
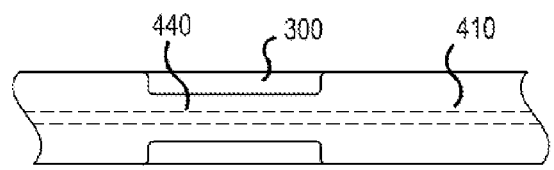
FIG. 11 is a side elevation view of the venting guiding portion of FIG. 10.
Figure 12:
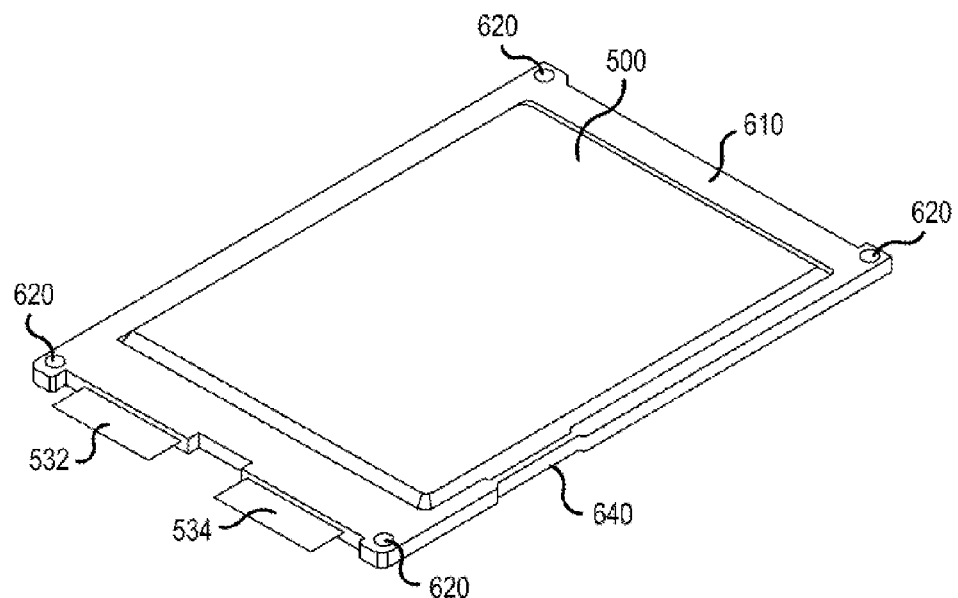
FIG. 12 is a perspective showing a structure in which a frame is coupled to a battery cell according to yet another embodiment of the present invention.

Regarding FIGS. 10 and 11, an outer circumference of a battery cell 300 is integrally coupled to a frame 410 by insert injection molding. The frame 410 is provided with a venting guiding portion 440 such that sealing of the battery case is released through the venting guiding portion 440 when internal pressure of the battery cell 300 increases. The frame 410 is also provided with an assembly type fastening structure 420, by which the frame 410 are coupled to one another. Frames 410 may be coupled and fixed to one another by the assembly type fastening structure 420 in a state in which the frames 410 are stacked in the vertical direction.

The venting guiding portion 440 is formed at the frame 410. Specifically, the venting guiding portion 440 is formed at a portion of the outer circumference of the battery cell 300, preferably in a direction perpendicular to a direction in which a cathode terminal 332 and an anode terminal 334 of the battery cell 300 protrude when viewed from above. As a result, when multiple battery cells 300 are stacked, venting guiding portions 440 are formed at the same position on the frame 410 such that the venting guiding portions 440 are arranged in a specific direction.

Each venting guiding portion 440 is formed by providing a reduced height of the frame 410 in a thickness direction of the frame 410 at the predetermined location relative to adjacent portions of the frame 410. By reducing the height of the frame at this localized area it is possible to control venting at this location relative to other locations. In particular, the reduced height of the frame creates an inherent weakness at the localized area, wherein the sealing of the battery case will be released at this weakened section when internal pressure increases to a predetermined level.

Regarding FIG. 12, the outer circumference of a battery cell 500 is integrally coupled to a frame 610 by insert injection molding. The frame 610 is provided with a venting guiding portion 640 such that sealing of the battery case is released through the venting guiding portion 640 when internal pressure of the battery cell 500 increases. The frame 610 is also provided with an assembly type fastening structure 620, by which the frame 610 are coupled to one another. Frames 610 may be coupled and fixed to one another by the assembly type fastening structure 620 in a state in which the frames 610 are stacked in the vertical direction.

The venting guiding portion 640 is formed at the frame 610. Specifically, the venting guiding portion 640 is formed at a portion of the outer circumference of the battery cell 500 in a direction perpendicular to a direction in which a cathode terminal 532 and an anode terminal 534 of the battery cell 500 protrude when viewed from above. As a result, when multiple battery cells 500 are stacked, venting guiding portions 640 are formed at the same positions of the frame 610 such that the venting guiding portions 640 are arranged in a specific direction.

Each venting guiding portion 640 is formed by providing a reduced width of the frame 610 relative to adjacent portions of the frame 610 at the predetermined location. By reducing the width of the frame 610 at this localized area it is possible to control venting at this location relative to other locations.

Figure 13:
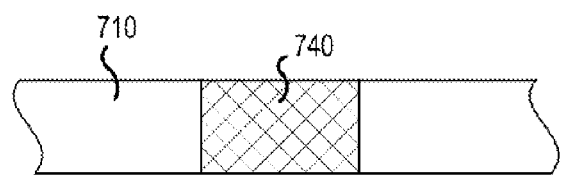
FIGS. 13 and 14 show other configurations of the venting guiding portions.
Figure 14:
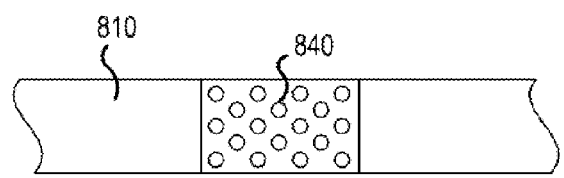

FIGS. 13 and 14 show other various approaches to provide venting guiding portions in a frame by reducing the amount of material of the frame in the predetermined location. As shown in FIG. 13, a venting guiding portion 740 is provided in a frame 710 by scoring the frame 710. The depth of the scoring can be controlled to provide a desired weakness in the frame 710 at the predetermined location. As shown in FIG. 14, a venting guiding portion 840 is provided in a frame 810 by providing a plurality of holes in the frame 810. While the holes are shown as circular, the venting guiding portion is not limited to circular holes as other cut-out shapes would work so long as they provided a desired weakness in the frame 810 at the predetermined location.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

As is apparent from the above description, the battery module according to the present invention is configured to have a structure in which a frame having a venting guiding portion is coupled to the outer circumference of a battery cell such that gas is discharged from the battery cell through the venting guiding portion in a predetermined direction when internal pressure of the battery cell 100 increases. Consequently, the present invention has the effect of easily and simply forming a venting structure by coupling the frame having the venting guiding portion to the battery cell without a necessity for forming a weak portion at the battery cell.

In addition, in the battery module according to the present invention, the frame is provided with an assembly type fastening structure, by which a plurality of frames is coupled to each other. Consequently, the present invention has the effect of easily and simply achieving coupling between the frames without a necessity of providing additional frame fastening means.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A battery cell, comprising:
   a battery case;
   an electrode assembly located in the battery case, said electrode assembly comprising a cathode, an anode, and a separator disposed between the cathode and the anode;
   an electrolyte present in the battery case;
   the battery case being sealed at a perimeter thereof, the perimeter being defined by a sealed edge of the battery case; and
   a frame coupled to the perimeter of the battery case, the frame having a venting guiding portion at the perimeter of the battery case, such that sealing of the battery case is released through the venting guiding portion when internal pressure of the battery cell increases, the venting guiding portion comprising a reduction in the amount of material of the frame in a predetermined location at the perimeter of the battery case such that the sealed edge at the predetermined location is covered by the venting guide portion,
   wherein the venting guiding portion is provided by a reduced height of the frame in a thickness direction of the frame at the predetermined location relative to heights of adjacent portions of the frame.

2. A battery module comprising a battery cell array comprising two or more battery cells according to claim 1.

3. A battery cell comprising:
   a battery case, the battery case being sealed at a perimeter thereof;
   an electrode assembly located in the battery case, said electrode assembly comprising a cathode, an anode, and a separator disposed between the cathode and the anode;
   an electrolyte present in the battery case; and
   a frame coupled to the perimeter of the battery case to encircle the battery case, the frame having a venting guiding portion from which a portion of the outer circumference of the battery cell is exposed such that sealing of the battery case is released through the venting guiding portion when internal pressure of the battery cell increases.

4. The battery cell according to claim 3, wherein the battery case is made of a laminate sheet comprising a resin layer and a metal layer, and sealing an outer circumference of the battery case by thermal bonding.

5. The battery cell according to claim 3, wherein the battery cell is configured to have a structure in which a cathode terminal and an anode terminal protrude from one side of the outer circumference thereof or a structure in which a cathode terminal protrudes from one side of the outer circumference thereof and an anode terminal protrudes from the opposite side of the outer circumference thereof.

6. The battery cell according to claim 5, wherein the venting guiding portion is formed at a portion of the outer circumference of the battery cell in a direction perpendicular to a direction in which the cathode terminal and the anode terminal protrude when viewed from above.

7. The battery cell according to claim 3, wherein the venting guiding portion is formed by cutting a portion of the frame such that a portion of the outer circumference of the battery cell is exposed.

8. A battery module comprising:
   a battery cell array comprising two or more stacked battery cells, each battery cell comprising:
   a battery case, the battery case being sealed at a perimeter thereof;
   an electrode assembly located in the battery case, said electrode assembly comprising a cathode, an anode, and a separator disposed between the cathode and the anode;
   an electrolyte present in the battery case; and
   a frame coupled to the perimeter of the battery case, the frame being configured to fix adjacent battery cells to form the stacked battery cells,
   wherein at least one of the frames of the battery cell array includes a venting guiding portion from which a portion of the outer circumference of the corresponding battery cell is exposed such that sealing of the battery case is released through the venting guiding portion when internal pressure of the battery cell increases.

9. The battery module according to claim 8, wherein the battery case and the frame of each battery cell are integrally coupled to each other by insert injection molding.

10. The battery module according to claim 8, wherein each of the battery cells is a plate-shaped battery cell, and
    wherein the battery cells are stacked such that at least one side of one battery cell faces a corresponding side of another adjacent battery cell to form the battery cell array.

11. The battery module according to claim 10, wherein the plate-shaped battery cell is a pouch-shaped battery cell manufactured by receiving an electrode assembly in a battery case made of a laminate sheet comprising a resin layer and a metal layer and sealing an outer circumference of the battery case by thermal bonding.

12. The battery module according to claim 11, wherein each of the frames is integrally coupled to the corresponding pouch-shaped battery cell such that each frame covers the outer circumference of the corresponding battery cell sealed by thermal bonding.

13. The battery module according to claim 10, wherein each of the battery cells is configured to have a structure in which a cathode terminal and an anode terminal protrude from one side of the outer circumference thereof or a structure in which a cathode terminal protrudes from one side of the outer circumference thereof and an anode terminal protrudes from the opposite side of the outer circumference thereof.

14. The battery module according to claim 13, wherein the venting guiding portion is formed at a portion of the outer circumference of the battery cell in a direction perpendicular to a direction in which the cathode terminal and the anode terminal of the battery cell protrude when viewed from above.

15. The battery module according to claim 8, wherein the venting guiding portion is formed at each of the frames.

16. The battery module according to claim 15, wherein the venting guiding portions are formed at the same positions of the frames.

17. The battery module according to claim 8, wherein the venting guiding portion is formed by cutting a portion of the frame such that a portion of the outer circumference of the corresponding one of the battery cells is exposed.

18. The battery module according to claim 8, wherein each of the frames is provided with an assembly type fastening structure, by which the frames are coupled to each other, such that the battery cell array forms a stable stack structure.

19. The battery module according to claim 18, wherein the assembly type fastening structure comprises a combination of a fastening protrusion formed at one side of each of the frames and a fastening groove formed at the other side of each of the frames opposite to the fastening protrusion.

20. The battery module according to claim 19, wherein the fastening protrusion is formed at a top or a bottom of each of the frames and the fastening groove is formed at the bottom or the top of each of the frames at a position corresponding to the fastening protrusion.

21. The battery module according to claim 20, wherein the fastening protrusion is formed in the shape of a cylinder protruding from a surface of each of the frames and comprises a hook tapered along an outer circumference of an upper end of the cylinder, and wherein the fastening groove is formed at a side opposite to the fastening protrusion in a cylindrically depressed shape and is provided at an inner circumference thereof with a catching protrusion, to which the hook of the fastening protrusion is fastened.

22. The battery module according to claim 21, wherein the hook is provided at an upper part thereof with one or more hollow portions, by which the hook is elastically fastened into the fastening groove.

23. The battery module according to claim 17, wherein the fastening protrusion and the fastening groove are formed at corner portions of each of the frames.

24. The battery module according to claim 20, wherein the fastening protrusion is formed in a wedge shape protruding while abutting on one side of each of the frames and comprises a hook tapered outwardly of each of the frames, and wherein the fastening groove is formed at a side opposite to the fastening protrusion in a depressed shape corresponding to the wedge shape and is provided with an opening, into which the hook of the fastening protrusion is fastened.

25. The battery module according to claim 24, wherein the fastening protrusion and the fastening groove are formed in plurality at an edge of each of the frames.

26. The battery module according to claim 8, wherein each of the frames comprises rubber or plastic.

27. The battery module according to claim 26, wherein each of the frames comprises silicone or thermo plastic polyurethane (TPU).

28. The battery module according to claim 8, wherein each of the battery cells is a lithium secondary battery.

29. A battery pack comprising a battery module according to claim 8.

30. A device comprising a battery pack according to claim 29.

31. The device according to claim 30, wherein the device is an electric vehicle, a hybrid electric vehicle, a plug-in hybrid electric vehicle, or a power storage device.

* * * * *